United States Patent
Ammerlaan et al.

(10) Patent No.: US 7,558,857 B2
(45) Date of Patent: Jul. 7, 2009

(54) SOLUTION DEPLOYMENT IN A SERVER FARM

(75) Inventors: Michael H. Ammerlaan, Sammamish, WA (US); Arulseelan Thiruppathi, Redmond, WA (US); Corey Michael Roussel, Redmond, WA (US); John Keith Bankston, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 86 days.

(21) Appl. No.: 11/172,439

(22) Filed: Jun. 30, 2005

(65) Prior Publication Data

US 2007/0005769 A1    Jan. 4, 2007

(51) Int. Cl.
   G06F 15/173   (2006.01)
   G06F 15/16    (2006.01)
   G06F 15/177   (2006.01)
(52) U.S. Cl. .................. 709/226; 709/208; 709/220
(58) Field of Classification Search .................. 709/226
    See application file for complete search history.

(56) References Cited

U.S. PATENT DOCUMENTS

| | | | | |
|---|---|---|---|---|
| 5,717,924 | A * | 2/1998 | Kawai | 707/102 |
| 6,947,992 | B1 * | 9/2005 | Shachor | 709/228 |
| 7,058,704 | B1 | 6/2006 | Mangipudi | |
| 7,181,539 | B1 * | 2/2007 | Knight et al. | 709/248 |
| 2002/0004824 | A1 * | 1/2002 | Cuan et al. | 709/208 |
| 2004/0003266 | A1 * | 1/2004 | Moshir et al. | 713/191 |
| 2004/0103195 | A1 * | 5/2004 | Chalasani et al. | 709/226 |
| 2004/0210320 | A1 * | 10/2004 | Pandya | 700/1 |
| 2005/0080891 | A1 * | 4/2005 | Cauthron | 709/223 |
| 2005/0138165 | A1 * | 6/2005 | Tang et al. | 709/224 |
| 2006/0015619 | A1 * | 1/2006 | Tse et al. | 709/226 |
| 2006/0015626 | A1 * | 1/2006 | Hallamaa et al. | 709/229 |

FOREIGN PATENT DOCUMENTS

WO    WO 03/107147 A2    12/2003
WO    WO 03/107147 A3    12/2003

OTHER PUBLICATIONS

"Process and Method for IT Energy Optimization," International Business Machines Corporation, Feb. 2002, Research Disclosure Database No.454196.
EP Search Report dated Dec. 23, 2008 cited in EP Application No. 06 75 9248.
European Communication dated Apr. 2, 2009 cited in EP Application No. 06 75 9248.5 - 1243 / 1889167.

* cited by examiner

*Primary Examiner*—William C Vaughn, Jr.
*Assistant Examiner*—Joiya M Cloud
(74) *Attorney, Agent, or Firm*—Merchant & Gould (57) ABSTRACT

A system and method is provided that allows solutions for a server farm to be submitted to a centralized location in the server farm. The submitted solutions can be selected and scheduled for automatic deployment for all servers in the server farm. Deployed solutions can be retracted from the servers in the server farm. A damaged server or a new server in the server farm can be synchronized to have the same solutions that have been deployed across the server farm.

21 Claims, 6 Drawing Sheets

SOLUTION DEPLOYMENT IN A SERVER FARM

BACKGROUND

Nowadays, the Internet is widely used to transfer applications to users through browsers. The Internet also is used for e-commerce in which individual customers and businesses use the Web to purchase various goods and services. In fact, some companies offer goods and services solely on the Web while others use the Web to extend their reach.

With respect to these commercial activities and others, businesses and other content providers employ servers to process requests from different users. Various architectures are employed in handling these requests. Often, distributed architectures in which a set of servers in a cluster ("server farm") are used to handle requests. In such a server farm architecture, the set of servers appears to a user as a single server. A load-balancing mechanism may be used to determine which server within the server farm will be used to handle various requests directed to the server farm.

Configuring and maintaining the various servers within a server farm has historically been a challenge. This challenge is exacerbated as the number of servers employed in a given server farm increases in number. In order to properly maintain servers within a server farm, the servers need to be updated from time to time. These updates include configuring data and services provided by the server to ensure settings and services in each of the servers are consistent with each other and to maintain near real-time knowledge of the various services and applications that exist on the servers of the server farm.

Unfortunately, current technologies that perform server management fail to provide a cohesive methodology for enabling systematic and comprehensive management of servers within a server farm. For example, a typical Internet system in an organization incorporates multiple Web servers to implement a highly reliable and scalable form. The Web servers in such a farm implementation need to be identically configured because they support the same set of logical content. However, over time, the server farm may need to be updated with solutions addressing specific customer requirements ("customer solutions"). For instance, new application components may be needed to be applied to the servers in the server farm. However, because an individual server has its own logic and physical characteristics, the administrators of these servers typically do not have the ability to perform one operation and have the operation be uniformly applied to the multiple servers in the server farm. As a result, an administrator of the server farm has to visit each server and deploy a customer solution individually on each server.

Such an individual deployment of customer solutions poses several problems. First of all, if multiple servers are used to support the same logic content, deploying customer solutions individually on each server may result in inconsistent deployment. Inconsistent deployment of solutions across the servers can cause undesirable operation of the same logic content. Second, an administrator may make mistakes during the deployment of multiple solutions individually to each server. As a result, the mistakes will manifest themselves in the servers as inconsistent and hard-to-diagnose problems. It is difficult for an administrator to ensure that multiple servers are consistent with each other with respect to their deployed solution state. Therefore, it is desirable to centrally store all configuration data, such as application settings and solutions, for each server in a server farm. It is also desirable that the centrally stored configuration data can be automatically deployed in a consistent manner to all servers in the server farm upon request.

SUMMARY

The invention addresses the above-identified needs by providing a system and a method for deploying solutions across a server farm. One aspect of the invention provides a configuration database that is the master copy of all configuration data in the server farm. The configuration database may include a solution store that collects logical objects containing solutions for the server farm. These logical objects include binaries for the solutions as well as information concerning the solutions, such as statuses for the solutions, e.g., whether a solution has been deployed to the server farm or not.

Another aspect of the invention provides multiple mechanisms for submitting solutions to the solution store. Such a mechanism may be to use a command-line tool or a Web interface to submit solutions to the solution store. The Web interface may be on a system remote to the server farm. Preferably, each submitted solution extends a configuration object model that allows the solution to be added into the solution store without the developer of the solution understanding or modifying the schema of the configuration database. Submitting a solution may require specific access rights to the solution store. The submitted solution may also need to go through some validation checks to ensure the solution is logically correct, free from viruses, or otherwise compatible with the server farm environment. Any solution failing to pass the validation checks is not deployed across the server farm.

Yet another aspect of the invention permits an administrator of the server farm to review the list of submitted solutions, to choose to deploy one or more of the submitted solutions to all servers in the server farm. The deployment of a solution may occur immediately once the solution is selected. The deployment of a solution may also be delayed to occur at a later time, for example, at midnight when usage of the server farm is low.

A timer service on each of the servers in the server farm is used to deploy solutions across a server farm comprising multiple servers. The timer service may deploy a solution in two phases. In the first phase, the timer service retrieves a solution bundle from the configuration database, unpacks the solution bundle, and stores the solution files to the specified directories on the server. In the second phase, the timer service installs the solution files on the server. A system service ("Admin Service") with a higher privilege than the timer service may be used to install the solution files into privileged areas in the server system. Upon completing installation of the solution, the timer service sends an installation completion message to the configuration database. Preferably, if the solution has been installed on all servers successfully, the configuration database will update the status of the solution, for example, from "to be deployed" to "deployed." Each server will then execute any custom solution code in the solution files.

In summary, the invention provides a system and method that allows developers of solutions to submit solutions for a server farm to a centralized location in the server farm while administrators of the server farm can independently select whether to deploy the solutions, and when. As a result, a solution for a server farm can be deployed consistently and automatically to all servers in a server farm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The novel features believed characteristic of the invention of the invention are set forth in the appended claims. The invention itself, however, as well as the preferred mode of use, further objectives and advantages thereof, will best be understood by reference to the following detailed description of an illustrative embodiment when read in conjunction with the accompanying drawings, wherein:

DETAILED DESCRIPTION OF THE EXEMPLARY EMBODIMENTS

Figure 1:
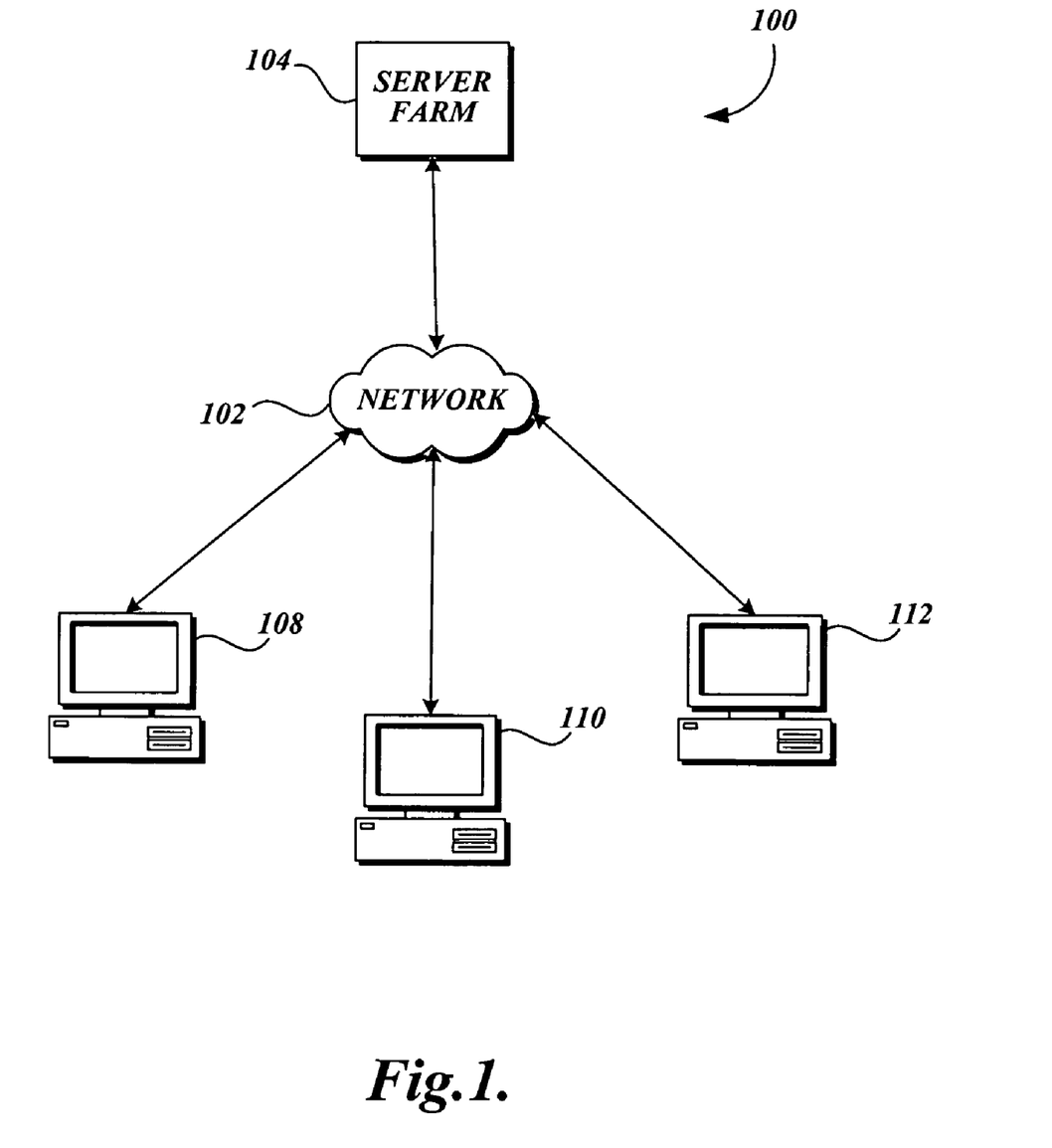
FIG. 1 is a block diagram illustrating an exemplary network of data processing systems in which aspects of the invention may be implemented.

FIG. 1 illustrates a pictorial representation of a network 100 of data processing systems in which an exemplary embodiment of the invention may be implemented. The network 100 of data processing systems includes a network 102, which is a medium used to provide communication links between various devices and computers connected together within the network 100 of data processing systems. The network 102 may include connections such as a wired or wireless communication link, fiber optic cables, and the like.

As shown in FIG. 1, the network 100 of data processing systems includes at least one server farm 104 and one or more clients 108-112, all of which are connected to the network 102. The server farm 104 is generally comprised of a set of servers that are presented as a single server or a "virtual" server for processing requests. The clients 108, 110, and 112 are clients to the server farm 104. These clients 108, 110, and 112 may be, for example, personal computers or network computers. Generally, the server farm 104 provides data, such as boot files, operating system images, applications, Web content, to the clients 108-112. The network 100 of data processing systems may include additional servers, clients, and other devices not shown.

In the depicted example, the network 100 of data processing systems is the Internet, where the network 102 represents a worldwide collection of networks and gateways that use a TCP/IP suite of protocols to communicate with one another. At the heart of the Internet is a backbone of high-speed data communication lines between major nodes or host computers. These nodes or host computers include thousands of commercial, government, educational, and other computer systems that route data and messages. The network 100 of data processing systems may also be implemented as a number of different types of networks, such as, for example, an intranet, a local area net (LAN), or a wide area network (WAN). FIG. 1 is intended as an example, and not as an architectural limitation of the invention.

Figure 2:
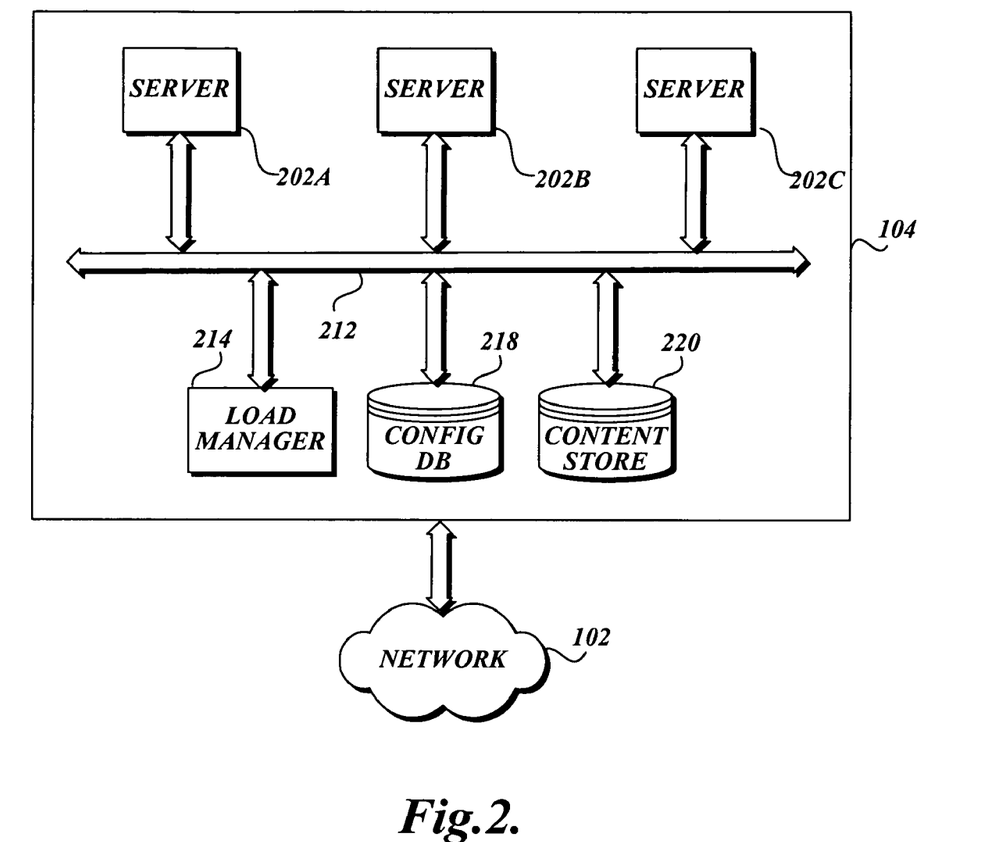
FIG. 2 is a block diagram illustrating an exemplary server farm suitable for use in FIG. 1.

FIG. 2 is a block diagram of a server farm 104 in accordance with an exemplary embodiment of the invention. As shown in FIG. 2, the server farm 104 includes a plurality of servers such as servers 202A, 202B, 202C, each of which communicates with each other through a communication system 212. The communication system 212 is used to handle routing requests and responses directed towards the server farm 104. The communication system 212 may take various forms, including, for example, a bus, a network, a shared memory, or the like.

The server farm 104 may include a load manager 214 that is connected to the communication system 212 and that serves to receive requests directed to the server farm 104 from the network 102. The requests may include requests received from clients 108-112 (FIG. 1) and may include, for example, requests for Web pages, files, or other content. The load manager 214 operates to distribute the requests to servers 202A-202C for processing. Essentially, the load manager 214 operates to ensure that none of the servers 202A-202C of the server farm 104 is unnecessarily burdened by requests made of the server farm 104.

Figure 3:
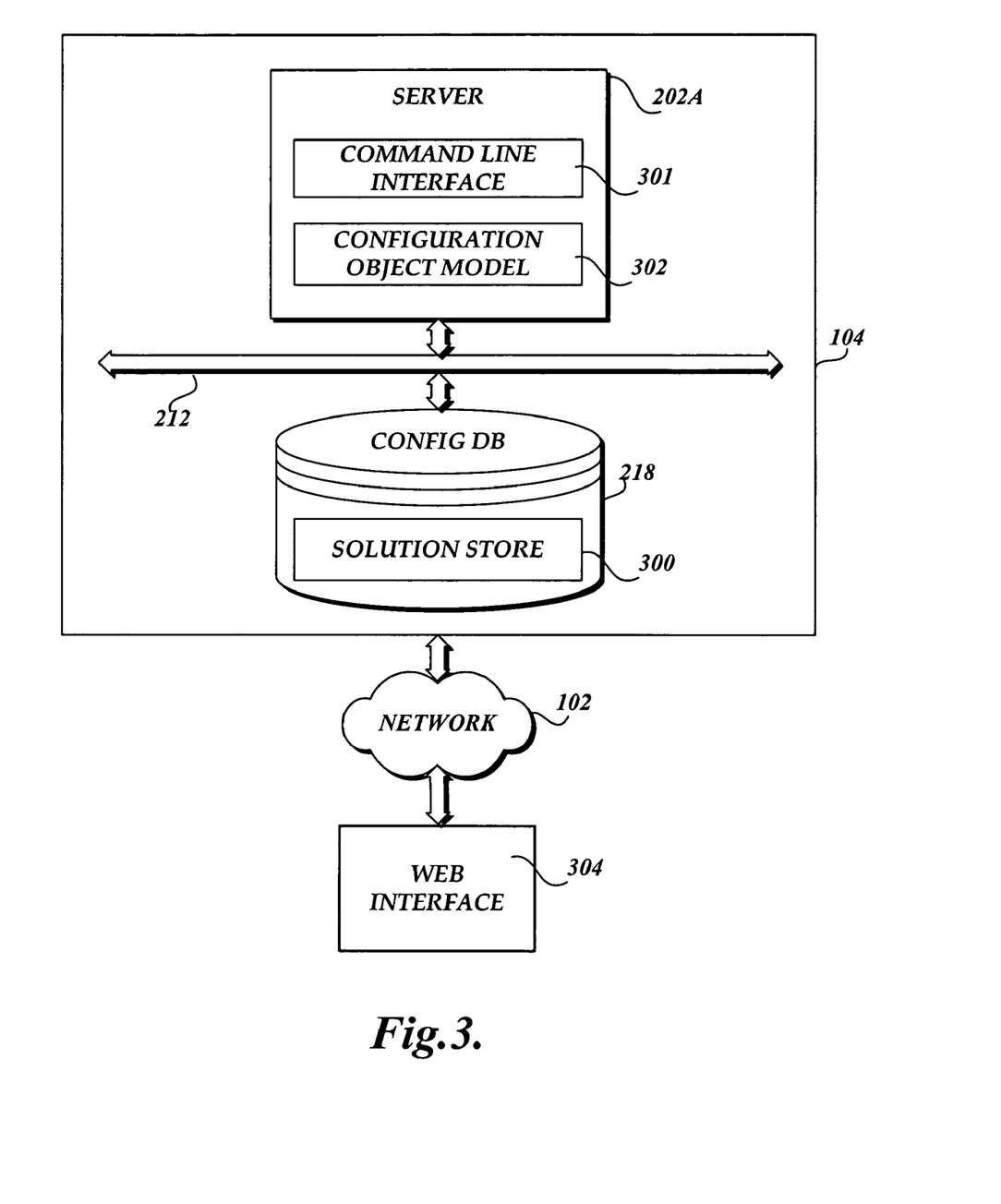
FIG. 3 is a block diagram illustrating an exemplary server farm, wherein solutions are submitted to a centralized location in the server farm.

In embodiments of the invention, the server farm 104 includes a configuration database 218 that stores all the configuration data for the server farm 104. In embodiments of the invention, the configuration database 218 is the master copy of all configuration data in the server farm 104, thus enables the same information to be available across a set of servers in the server farm 104. The configuration database 218 is operatively connected to the communication system 212 to allow configuration data to be sent to each of the servers 202A-202C in the server farm 104. The configuration database 218 is used to manage configuration settings of each of the servers 202A-202C. The configuration database 218, therefore, acts as a central repository for any configuration settings that must be changed and/or added to the various servers 202A-202C of the server farm 104. Providing the configuration database 218 eliminates the necessity of having to manually update and/or add configuration settings of the servers 202A-202C. Besides storing information about a server topology, the configuration database 218 may also store application-specific settings such as security policies, antivirus definitions, language settings, etc. In embodiments of the invention, the configuration data may store one or more solutions that are applicable to servers in the server farm 104. A solution includes bundled files that contain application code, definitions, and localized resources that can instruct a server on providing specific content or services. Preferably, as shown in FIG. 3, the configuration database 218 may include a distinct unit named solution store 300. The solution store 300 includes a set of logic objects. Each logic object includes the binary files that represent a solution as well as state information concerning the status of each solution such as whether the solution has been selected for deployment, or whether the solution has been deployed, etc.

The server farm 104 may also include at least one content store 220. Similar to the other operational elements of the server farm 104, the content store 220 is operationally connected to the communication system 212 in order to allow information stored within the content store 220 to be distributed to the various components of the server farm 104. In exemplary embodiments of the invention, the content store 220 contains data for the servers in the server farm 104. Such data include documents, data items, discussions, tasks, etc. The content store 220 operates in conjunction with the configuration database 218 to provide content specifically related to a given configuration change of one or more of the servers 202A-202C. In exemplary embodiments of the invention, the content store 220 does not interface with the configuration database 218. The configuration database 218 contains a map of which content database stores data for a server. As a result, it is not necessary to query each content store 220 in the server farm 104 to see if the content store contains the content for a particular server in the server farm 104.

In exemplary embodiments of the invention, the server farm 104 is arbitrarily extensible. This includes that the server farm 104 can be arbitrarily extended with multiple servers other than the servers 202A-202C. In addition, the server farm 104 may include multiple content stores 220 to store data for the multiple servers in the server farm 104.

In particular, exemplary embodiments of the invention allow solutions to be added to the configuration database 218 and/or the solution store 300 through multiple transport mechanisms. FIG. 3 illustrates exemplary transport mechanisms through which solutions may be submitted and added to the configuration database 218. One exemplary transport mechanism is a command-line interface 301. Another exemplary transport mechanism is a Web interface 304. The Web interface 304 may be outside the server farm, and communicates with the configuration database 218 through the network 102. Such a Web interface 304 provides a remote experience for submitting solutions. Other alternative transport mechanisms for integrating solutions into the configuration database 218 include using remote procedure calls or an SOAP interface to facilitate automated submissions and deployment of solutions for the server farm 104.

In exemplary embodiments of the invention, submitted solutions extend a configuration object model 302 that enables arbitrary extension of the configuration database 218. The configuration object model 302 allows a user to expand or update configuration data for the server farm 104 without requiring the user to understand or modify the schema of the configuration database 218. In an exemplary embodiment of the invention, the configuration object model 302 includes a .Net object-based class. A user can extend the base class by subclassing or instantiating the base class with specific configuration data. Such data is then integrated into the configuration database 218. As a result, a user only needs to go through the configuration object model 302 to add varying types of data into the configuration database 218. The user does not need to understand or modify the schema of the configuration database 218. In an exemplary embodiment of the invention, objects containing configuration information for an application are either derived from or contained by the base class, named, for example, as PersistedObject. When updated, this class will serialize into XML all fields marked with the "persisted" attribute, and write the XML blob into the configuration database 218. The base class contains code to serialize all of its members that are base types, other PersistedObjects, or collections of one of the two. Such design allows new objects containing configuration data for the server farm 104 to be added to the configuration database 218 as needed.

In exemplary embodiments of the invention, regardless of the transport mechanism, a developer or an administrator submitting solutions to the configuration database 218 needs to have particular rights to access the configuration database 218. Absent these particular rights, the developer or the administrator cannot submit solutions to the configuration database 218. In addition, in the exemplary embodiments of the invention, a submitted solution will be deployed only if it passes certain validation checks to ensure that the solution is logically correct, free from viruses, or otherwise compatible with the server farm 104.

The configuration database 218 and/or the solution store 300 thus provide a centralized location for storing solutions submitted by developers and/or administrators of the server farm 104. Submission of solutions to the configuration database 218 can be independently secured from the ability to deploy the solutions from the configuration database 218. This segregation enables the administrators of the server farm 104 to let developers submit solutions while reserving the ability to independently audit these submissions before deploying them.

Figure 4:
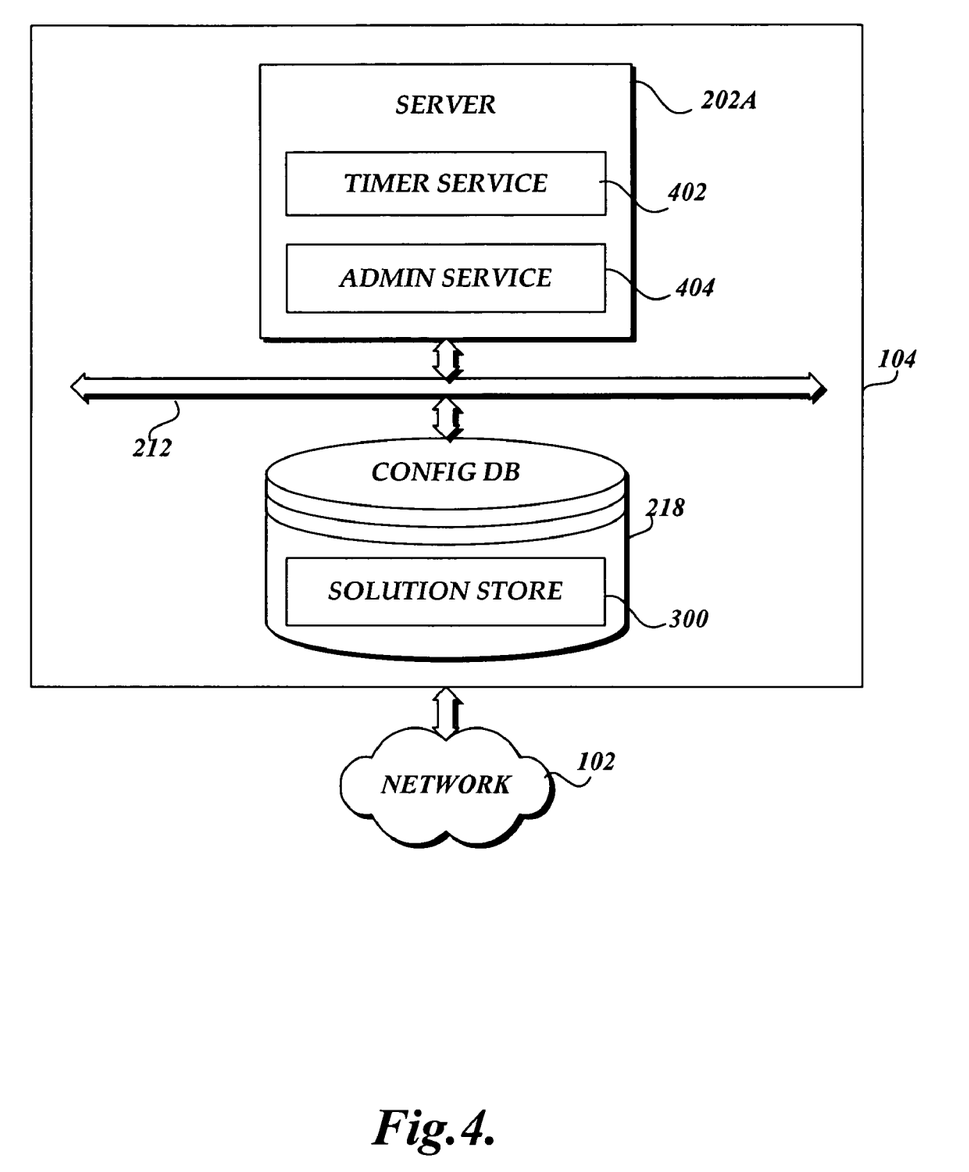
FIG. 4 is a block diagram illustrating an exemplary server farm wherein solutions are deployed to each server in the server farm.

Embodiments of the invention automatically deploy a given solution to multiple servers in a server farm such as the server farm 104. Embodiments of the invention provide a pull-based mechanism for querying and pulling solutions from the configuration database 218 to a server in the server farm 104. In exemplary embodiments of the invention, such a pull-based mechanism is realized by a timer service contained in each server in the server farm 104. The timer service queries the configuration database 218 to synchronize any pending changes. Such pending changes include any changes to the solution store 300 or set of timer jobs that are running across the entire server farm 104. Using such a pull-based mechanism avoids the need to open an additional TCP/IP port on a server such as the server 202A in order to communicate with the configuration database 218. By not requiring an additional open port, less risk is resulted on the server by not exposing a potential entryway for hackers, viruses, or other forms of attack. FIG. 4 illustrates an exemplary implementation of the pull-based mechanism for querying and pulling solutions from the configuration database 218. As shown in FIG. 4, the server 202A contains a timer service 402. Operationally, the timer service 402 queries configuration database 218 and/or the solution store 300 to determine which, if any, solutions need to be deployed to the server farm 104 and hence to the server 202A.

In embodiments of the invention, an administrator of the server farm 104 can review the list of submitted solutions in the solution store 300. The administrator can choose to deploy one or more of the submitted solutions, and can choose to do so for a set of servers in the server farm 104 or on behalf of the entire server farm 104.

In embodiments of the invention, an administrator can also choose to deploy a solution as soon as reasonable ("immediate deployment") or at a later time ("delayed deployment"). When there is only one server in the server farm 104 or when delayed deployment of solutions in the solution store 300 is not necessary, deployment of the solution in the solution store 300 occurs immediately. There are two types of immediate deployment. In a one-server server farm situation, immediate deployment occurs on the same system where the administrator issues the deployment request. No pull-based mechanism such as the timer service 402 is needed. In a multi-server server farm 104, immediate deployment uses the timer service 402 first as a communication mechanism to inform timer services other servers in the server farm 104 to begin deployment. When an administrator wishes to delay deployment of solutions in a multi-server server farm 104, for example, until midnight when usage of the server farm 104 is low, the deployment of the solution is called delayed deployment. The timer service 402 is used in delayed deployment.

In exemplary embodiments of the invention, the timer service 402 performs solution deployment in two phases. In the first phase, the timer service 402 instructs the server 202A to retrieve the solution bundle from the configuration database 218, to unpack the solution bundle, and to store the solution files to the specified directories in the server 202A. Once all the servers in the server farm 104 have deployed the solution uniformly, and no failure has occurred, the timer service 402 initiates the second phase. During the second phase, the timer service 402 installs the solution files, executes any custom solution codes for the server 202A, and updates the configuration information in the configuration database 218. The configuration information in the configuration database 218 is not affected if one or more servers within the server farm 104 fail to deploy the solution properly.

In exemplary embodiments of the invention, the timer service 402 uses a restricted privilege to deploy a solution. Such a restricted privilege enables the timer service 402 to communicate and update the configuration database 218, but not to manipulate entities on the server 202A on which the timer service 402 runs. Such segmentation ensures that the timer service 402 does not receive more security privileges than necessary. However, for operations such as installing solution files to privileged areas in the server, the restricted privilege of the timer service 402 is not sufficient. In such case, the timer service 402 communicates with a second service, named Admin Service 404. The Admin Service 404 has elevated privileges on the server 202A and can install the solution files to privileged areas in the server 202A.

Some embodiments of the invention also provide a synchronization mechanism that allows an administrator to pull updated solutions from the configuration database 218 and to apply the solutions to a specific server in the server farm 104, such as the server 202A. This mechanism allows an administrator to repair a specific server in the server farm 104, or to prepare a new server that has just joined the server farm 104 to keep the server synchronized with the settings on other servers in the server farm 104. The synchronization mechanism compares the set of deployed solutions in the solution store 300 against the set of files and changes that have been locally deployed on the specific server, and downloads from the solution store 300 the files or changes that are missing. The synchronization mechanism can be used to repair the state of a server by making it consistent with the state in the solution store 300 specified for all servers in the server farm 104. The synchronization mechanism can also let an administrator explicitly choose to update one or more servers, rather than use the timer service 402 to deploy a solution to all servers in the server farm 104.

In an exemplary embodiment of the invention, an administrator can also choose to retract solutions that have already been deployed on all servers in the server farm 104. The retraction of solutions is the inverse of solution deployment described above. The retraction operation requests that servers in the server farm 104 remove one or more deployed solutions. Preferably, the retraction operation does not include removing the solutions from the configuration database 218.

Figure 5A:
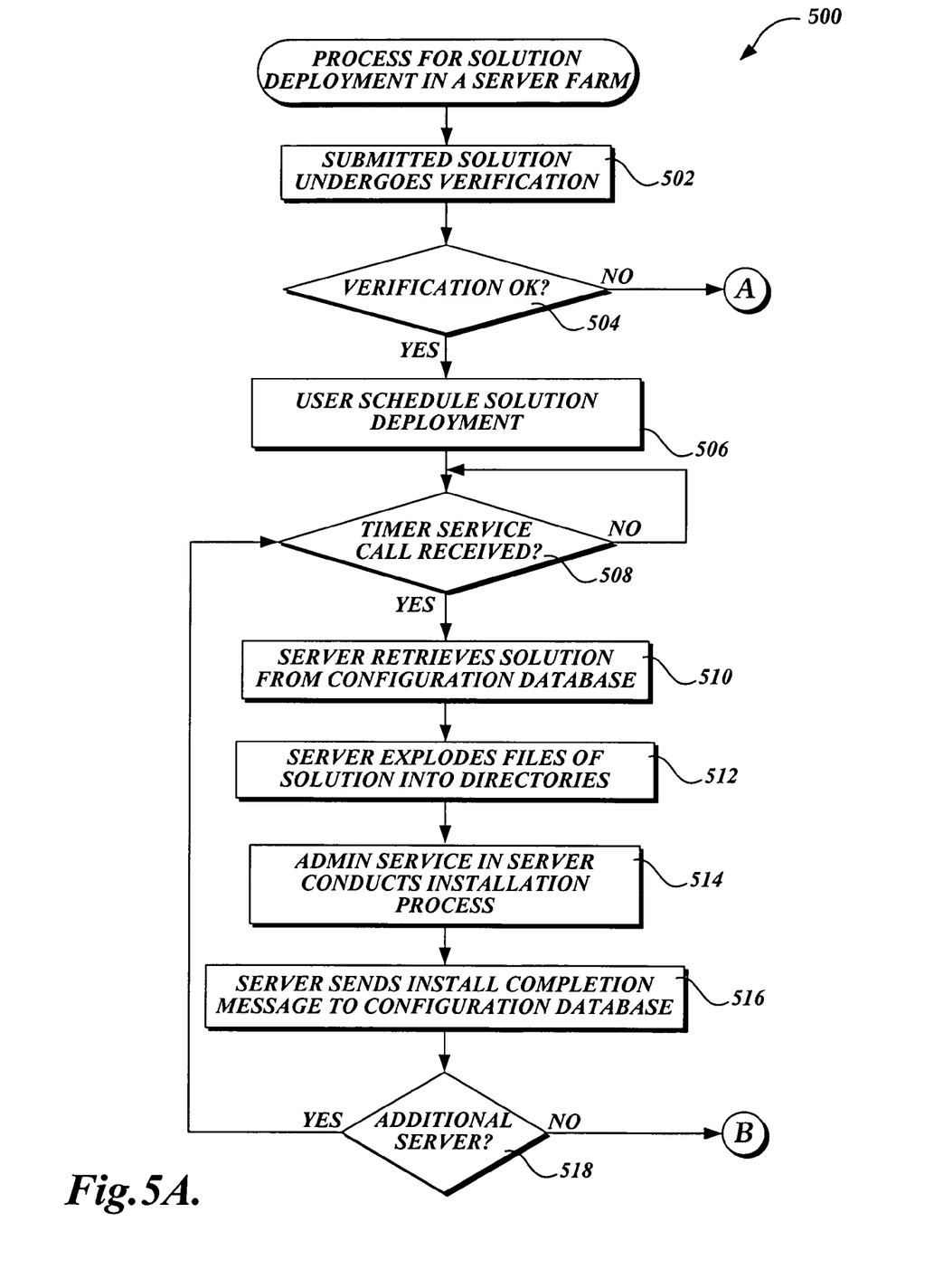
FIGS. 5A-5B are a flow diagram illustrating an exemplary process for solution deployment in a server farm.
Figure 5B:
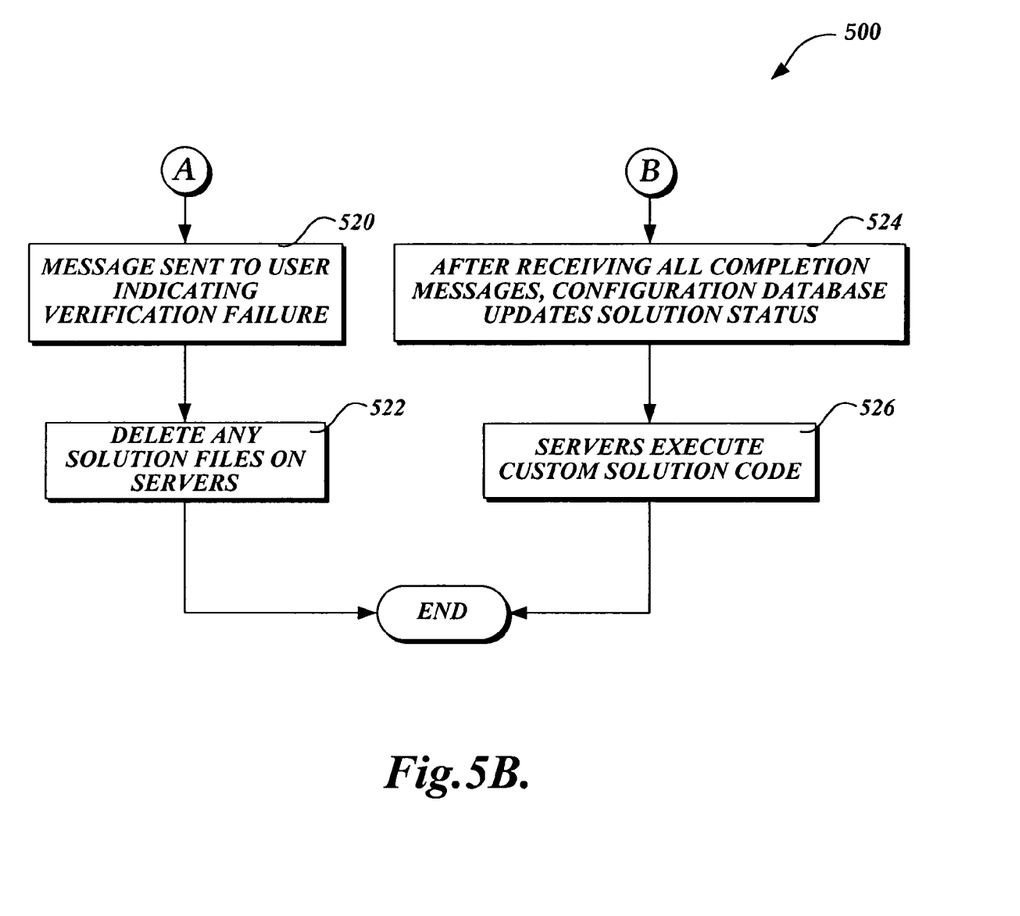

FIGS. 5A-5B include a flow diagram illustrating an exemplary process 500 for deploying a solution to servers in a server farm. In some embodiments of the invention, upon a solution is submitted to the configuration database in the server farm, the solution undergoes verification. The verification of the solution includes determining whether the solution is logically correct, free from viruses, or otherwise compatible with the server farm environment. The process 500 thus starts by verifying any submitted solution. See block 502. The process 500 then proceeds to determine whether the verification is successful. See decision block 504. If the verification has failed, the process 500 proceeds to a continuation terminal A. If the answer to the decision block 504 is YES, meaning the verification is successful, the solution is ready for deployment. Alternatively, a submitted solution undergoes the verification process before the solution is to be deployed to the server farm.

As noted above, solution deployment may occur immediately upon an administrator selecting a solution to deploy. Solution deployment may also be scheduled for a later time such as midnight when the usage of the server farm is low. The process 500 lets a user such as an administrator schedule solution deployment. See block 506. A solution is deployed to all servers in a server farm. The process 500 thus goes through a loop that starts with a decision block 508 and ends with a decision block 518 to deploy the solution to each server in the server farm. In the loop, the process 500 first determines whether the server has received a call from a timer service running on the server such as the timer service 402 illustrated in FIG. 4. See decision block 508. If the answer is NO, the process 500 does not proceed further. If the answer to decision block 508 is YES, meaning the server has received a call from the timer service to deploy the solution, the process 500 proceeds to let the server retrieve the solution from a configuration database that centrally stores solutions for the server farm. See block 510. The server then explodes files contained in the downloaded solution into the proper directories in the server. See block 512. When necessary, the process 500 lets an Admin Service in the server, such as the Admin Service 404 illustrated in FIG. 4, to conduct the installation process for the solution. See block 514. The installation process will copy the solution files into proper directories and set up proper solution configurations. Upon finishing the installation process, the timer service sends a message to the configuration database indicating that the solution has been deployed and installed on the server. See block 516. The process 500 then checks whether another server in the server farm needs to deploy the solution. See decision block 518. If the answer is YES, the process 500 loops back to decision block 508 to verify whether it can start to deploy the solution for the other server. If the answer to decision block 518 is NO, meaning no more servers in the server farm need to deploy the solution, the process 500 proceeds to a continuation terminal B.

In embodiments of the invention, a solution will be deployed to all servers in the server farm only if the solution passes the verification. Therefore, from the continuation terminal A (FIG. 5B), when a solution fails to pass the validation, a message is sent to the user, e.g., the administrator who requested to deploy the solution across the server farm, to indicate that a verification of the solution has failed. See block 520. As a result, any solution files existing on the servers in the server farm will be deleted, though the configuration database preferably still keeps the solution bundle. See block 522. The process 500 then exits and the solution is not deployed to any server in the server farm.

In contrast, when a solution has been successfully deployed and installed on all servers in the server farm, the servers execute any custom solution code and the configuration database will update its data concerning the solution. For example, the status of the solution in the configuration database may be changed from "to be deployed" to "deployed." Therefore, from continuation terminal B (FIG. 5B), upon the servers in the server farm having successfully installed the solution, the process 500 proceeds to update the configuration database concerning the solution. See block 524. The process 500 then proceeds to let all servers in the server farm execute any custom solution code associated with the solution. The process 500 then ends.

While the exemplary embodiments of the present invention have been illustrated and described, it will be appreciated that various changes can be made therein without departing from the spirit and scope of the present invention.

The embodiments of the invention in which an exclusive property or privilege is claimed are defined as follows:

1. A method for deploying a solution in a server farm, the method comprising:
    storing solutions for the server farm on a central database, including a schema, wherein each solution comprises:
        application executable code,
        definitions, and
        localized Web interface resources for instructing a server to provide at least one of a specific content and service;
    extending the schema of the central database using a configuration object model;
    querying the central database for solutions to be deployed to the server farm; and
    in response to querying the central database, deploying at least one solution to a plurality of servers, wherein each of the plurality of sewers contains a timer service for automatically deploying the at least one solution to the plurality of servers, wherein each of the solutions extends the configuration object model that allows the solution to be submitted to the central database without schema of the central database being modified, wherein deploying the at least one solution comprises:
        instructing the server to retrieve the at least one solution from the central database,
        unpacking the at least one solution,
        storing the at least one solution in at least one specified directory in the server,
        determining whether at least one failure occurred, and
        in response to determining whether at least one failure did not occur,
            installing the at least one solution,
            executing custom solution codes, and
            updating configuration information in the configuration object model.

2. The method of claim 1, further comprising an interface for submitting solutions to the central database.

3. The method of claim 2, wherein the interface is selected from a group of interfaces consisting of a command-line tool and a Web interface.

4. The method of claim 3, wherein the Web interface is external to the server farm.

5. The method of claim 1, wherein the timer service deploys the at least one solution at a scheduled time.

6. The method of claim 1, wherein the timer service deploys the at least one solution after the at least one solution has successfully passed a verification.

7. The method of claim 6, wherein the verification determines whether the at least one solution meet a pre-defined criteria for deployment.

8. The method of claim 6, wherein the server further includes a second service for installing the retrieved at least one solution to areas on the server having a pre-defined privilege level.

9. The method of claim 1, further comprising a retraction mechanism that removes the at least one solution from the at least one server in the server farm, after the at least one solution have been deployed.

10. The method of claim 1, further comprises a synchronization mechanism that synchronizes a server in the server farm with the at least one solution that have been deployed to the at least one server, wherein the server is selected from a group of servers consisting of one of the at least one server and a new server for the server farm.

11. A computer-implemented method for solution deployment in a server farm including a at least one server, comprising:
    storing in a central database solutions submitted for the server farm, each solution extending a configuration object model and a schema of the central database, each, solution including application executable code, definitions, and localized Web interface resources for instructing a server to provide at least one of a specific content and service, wherein each of the submitted solutions extends the configuration object model that allows the solution to be submitted to the central database without the schema of the central database being modified;
    identifying at least one of the solutions for deployment to the at least one server upon receiving a request;
    verifying the at least one of the solutions; and
    deploying the at least one of the solutions to the at least one server, wherein deploying the at least one solution to the at least one server comprises:
        instructing the server to retrieve the at least one solution from the central database,
        unpacking the at least one solution,
        storing the at least one solution in at least one specified directory in the server,
        determining whether at least one failure occurred, and
        in response to determining whether at least one failure did not occur,
            installing the at least one solution,
            executing custom solution codes, and
            updating configuration information in the configuration object model.

12. The method of claim 11, wherein storing in a central database solutions submitted for the server farm includes accepting the submissions from an interface.

13. The method of claim 12, wherein the interface is selected from the group of interfaces consisting of a command-line tool and a Web interface.

14. The method of claim 13, wherein the Web interface is external to the server farm.

15. The method of claim 11, wherein deploying the at least one solution to the at least one server include deploying the at least one solution at a scheduled time.

16. The method of claim 11, wherein deploying the at least one solution to the at least one server after the at least one solution has successfully passed a verification.

17. The method of claim 16, wherein the verification ensures that the at least one solution is fit for deployment.

18. The method of claim 17, further comprising installing the at least one solution on the server, using a second service on the server that has privilege for installing the at least one solution to privileged areas on the server.

19. The method of claim 18, further comprising updating the central database to indicate that whether the at least one solution has been successfully deployed.

20. The method of claim 11, further comprising removing the at least one solution from the plurality of servers upon receiving a retraction request.

21. The method of claim 11, further comprising synchronizing a server in the server farm with the at least one solution that have been deployed to the at least one server, wherein the server is selected from a group of servers consisting one of the at least one server and a new server for the server farm.

* * * * *